United States Patent
Orberk et al.

(10) Patent No.: US 7,362,767 B2
(45) Date of Patent: Apr. 22, 2008

(54) INTEGRATED CIRCUIT WITH ON-CHIP CLOCK FREQUENCY MATCHING TO UPSTREAM HEAD END EQUIPMENT

(75) Inventors: Omer F. Orberk, Mountain View, CA (US); Ho-Ming Leung, Cupertino, CA (US); Chiu-Tsun Chu, Cupertino, CA (US); Gary Chang, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 902 days.

(21) Appl. No.: 10/624,264

(22) Filed: Jul. 22, 2003

(65) Prior Publication Data
US 2005/0018692 A1    Jan. 27, 2005

(51) Int. Cl.
*H04L 12/56* (2006.01)

(52) U.S. Cl. ............ 370/395.62; 713/400; 713/401; 375/356

(58) Field of Classification Search ........... 370/395.62, 370/345, 389; 713/400; 331/16
See application file for complete search history.

(56) References Cited

U.S. PATENT DOCUMENTS

| 7,043,651 | B2* | 5/2006 | Aweya et al. ............... 713/400 |
| 7,191,355 | B1* | 3/2007 | Ouellette et al. ........... 713/400 |
| 2006/0062195 | A1* | 3/2006 | Gervais et al. ............. 370/345 |
| 2006/0109059 | A1* | 5/2006 | Skerritt ........................ 331/16 |
| 2006/0153182 | A1* | 7/2006 | Lockridge et al. .......... 370/389 |

* cited by examiner

*Primary Examiner*—Chi Pham
*Assistant Examiner*—Albert T. Chou
(74) *Attorney, Agent, or Firm*—Christopher P. Maioran

(57) ABSTRACT

One aspect of the present invention concerns a method for controlling the frequency of oscillation of a local clock signal comprising the steps of (A) generating the clock signal in response to a first control signal, (B) generating the first control signal in response to one of a plurality of adjustment signals selected in response to a second control signal and (C) generating the second control signal in response to a comparison between a local timestamp and an external timestamp.

18 Claims, 4 Drawing Sheets

INTEGRATED CIRCUIT WITH ON-CHIP CLOCK FREQUENCY MATCHING TO UPSTREAM HEAD END EQUIPMENT

FIELD OF THE INVENTION

The present invention relates to a satellite or cable transmission system generally and, more particularly, to a method and/or apparatus for implementing an integrated circuit with on-chip clock frequency matching to upstream head end equipment.

BACKGROUND OF THE INVENTION

Conventional broadband communication products, such as television set top boxes, have a system clock that is slaved to one or more pieces of upstream head end equipment. Without slaving the clocks, a two clock system would drift. Such drifting could eventually cause an input data buffer and/or an output data buffer within the set top box to overflow or underflow. Additional issues, such as synchronization problems, could also occur.

Conventional solutions use hardware to compare a timestamp sent from the upstream head end equipment with an on chip local clock timestamp. The difference between the two timestamps is used to generate a difference signal. The difference signal is normally a digital signal that is presented outside of an integrated circuit (IC) seated inside the set top box. The digital difference signal is used to drive a digital to analog (D/A) converter. The digital to analog converter produces an analog signal having a magnitude proportional to the difference of the two timestamps. The analog signal would then drive an external voltage controlled oscillator (VCO). A frequency presented by the VCO is adjusted up or down and used to drive a system clock of the IC of the set top box. A feedback loop is created using external components, such as an analog to digital (A/D) converter, low pass filter and oscillator. Such conventional approaches implement several external discrete components. However, using discrete components creates a high cost and often results in high chip counts.

It would be desirable to match the frequency of a set top box to the frequency of upstream head end equipment by using software within the set top box.

SUMMARY OF THE INVENTION

One aspect of the present invention concerns a method for controlling the frequency of oscillation of a local clock signal comprising the steps of (A) generating the clock signal in response to a first control signal, (B) generating the first control signal in response to one of a plurality of adjustment signals selected in response to a second control signal and (C) generating the second control signal in response to a comparison between a local timestamp and an external timestamp.

Another aspect of the present invention concerns an apparatus comprising an oscillator, an adjustment circuit and a tuning circuit. The oscillator may be configured to generate a clock signal in response to a first control signal. The adjustment circuit may be configured to generate the first control signal in response to one of a plurality of adjustment signals selected in response to a second control signal. The tuning circuit may be configured to generate the second control signal in response to a comparison between a local timestamp and an external timestamp.

The objects, features and advantages of the present invention include providing a method and/or apparatus that may (i) implement an integrated circuit having on chip clock frequency matching to upstream head end equipment, (ii) be implemented in software, (ii) be implemented without discrete external components, (iv) be implemented without adding to the cost of a set top box, (v) provide flexibility in set top box design and/or (vi) be implemented in any system needing clock synchronization.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may be implemented using software within an on chip embedded controller in a set top box. The present invention may compare the difference between a head end timestamp (e.g., received from a satellite or cable input) and a local timestamp (e.g., generated internally to the set top box). The present invention may be implemented without specific hardware for processing timestamp information.

Figure 1:
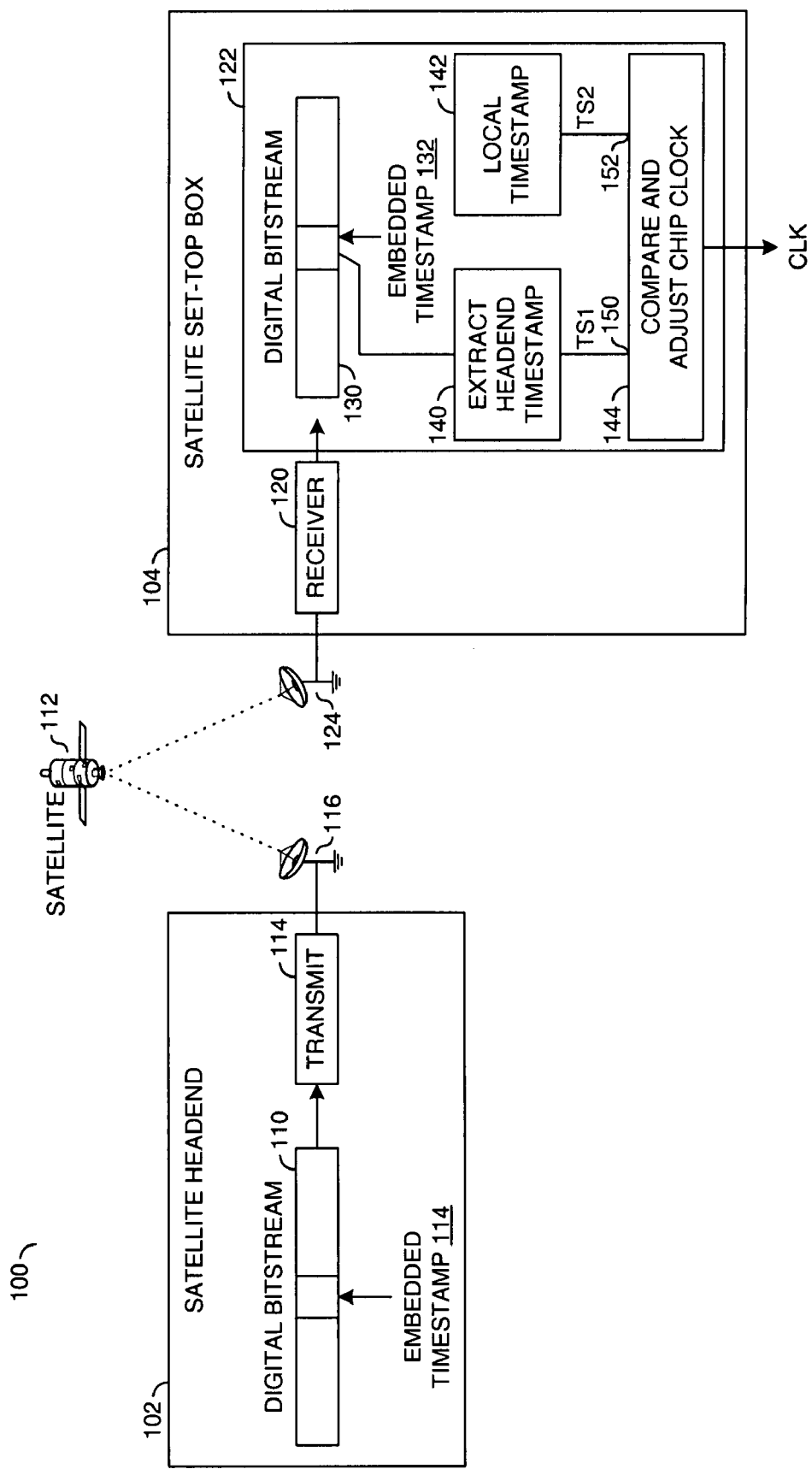
FIG. 1 is a context diagram illustrating a preferred embodiment of the present invention.

Referring to FIG. 1, a diagram of a system 100 is shown in accordance with the preferred embodiment of the present invention. The system 100 generally comprises a head end block (or circuit) 102 and a decoder block (or circuit) 104. The decoder block 104 may be implemented as part of a satellite (or cable) set top box. In particular, the decoder 104 may be implemented as a controller implemented within a satellite (or cable) set top box. The head end block 102 generally presents a digital bitstream 110 to a satellite 112. The digital bitstream generally includes an embedded timestamp 114. The satellite 112 may be implemented as a physical satellite orbiting in space. The digital bitstream 110 is generally presented through a transmitter 114 that drives a transmitting device 116. The transmitting device 116 may be a satellite dish or other appropriate transmitting system.

The circuit 104 may be implemented as a controller circuit (e.g., a chip or integrated circuit) within the satellite set top box. The decoder 104 generally comprises a receiver block (or section) 120 and a processing block (or section) 122. The receiver block 120 may be implemented as a receiver chip connected to an antenna 124. The antenna 124 may be implemented as a satellite receiver antenna or other appropriate receiving device. For example, a typical residential environment uses a variety of satellite antennas such as 18 inch round dishes, 20 inch round dishes, 20 inch elliptical dishes, 22 inch elliptical dishes, etc. Additional satellite antennas are routinely developed (e.g., the multi-LNB "superdish" was recently announced). The present invention is not limited to a particular satellite antenna. The receiver 120 generally receives a signal from one of the low noise blockers (LNB) of the antenna 124. The receiver then presents a digital bitstream 130. In an alternate implementation, the digital bitstream 130 may be received from a cable television system.

In general, the digital bitstream 130 is a replication of the digital bitstream 110. An embedded timestamp 132 may be present within the digital bitstream 130. The timestamp 132 may be a replica of the timestamp 114. The decoder 104 may also comprise a block (or circuit) 140, a block (or circuit) 142, and a block (or circuit) 144. The block 140 may be implemented to extract a head end timestamp. The block 142 may be implemented to extract a local timestamp. The block 144 may be implemented as a compare and adjust chip clock block. The block 140 may generate a timestamp (e.g., TS1). The timestamp TS1 may be a headend timestamp representing the timing of the headend block 102. The block 142 may generate a timestamp (e.g., TS2). The timestamp TS2 may be a local timestamp representing the timing of the block 104. The blocks 140, 142 and 144 may be implemented in software (or firmware).

The circuit 144 may have an input 150 that generally receives the signal TS1 and an input 152 that generally receives the signal TS2. The block 104 generally compares the timestamp TS1 with the timestamp TS2. The block 144 generally presents a local clock signal (e.g., CLK). The circuit 104 may calculate an adjustment to the timestamp TS1 based on the comparison between the timestamp TS1 and the timestamp TS2. The adjustment may be needed for the local clock signal CLK to match the timing information from embedded timestamp TS1.

Figure 2:
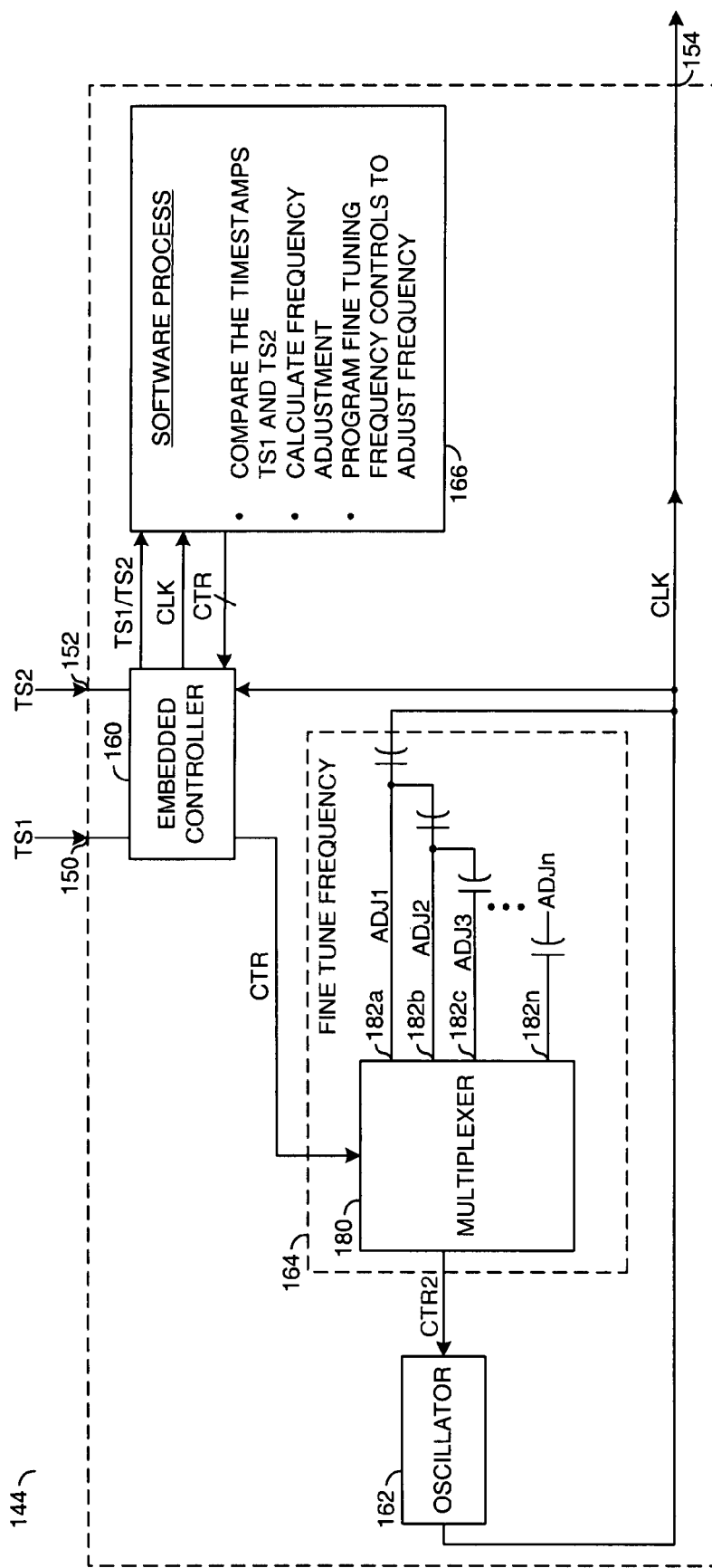
FIG. 2 is a diagram illustrating a controller circuit within a set top box in accordance with the present invention.

Referring to FIG. 2, a more detailed diagram of the block 144 is shown. The block 144 generally comprises a controller 160, an oscillator 162, a block (or circuit) 164, and a block (or circuit) 166. The block 160 may be implemented as an embedded controller. The block 162 may be implemented as a crystal oscillator. However, other oscillators, such as digital synthesizers with or without a crystal may be implemented to meet the design criteria of a particular implementation. The block 164 may be implemented as a frequency tuning block. The block 166 may be implemented as software control logic. The software control logic block 166 may be used to (i) compare the timestamp TS1 with the timestamp TS2, (ii) calculate a frequency adjustment and (iii) program a number of signals (e.g., CTR) to adjust the frequency of oscillation of the clock signal CLK. The block 166 generally presents the control signals CTR to the block 164, through the controller 166.

The block 164 may be implemented as a multiplexer 180. The multiplexer 180 may have a number of inputs 182a-182n, each configured to receive one of a number of adjustment signals (e.g., ADJ1-ADJn). The multiplexer 180 generally presents a control signal (e.g., CTR2) by selecting one of the adjustment signals ADJ1-ADJn. The selection is generally controlled by the signal CTR.

The block 166 generally receives the signal CLK, the timestamp TS1 and the timestamp TS2 from the controller 160. The block generally presents the signal CTR to the controller 160. The signals CLK, TS1 and TS2 are generally referred to as signals between the controller 160 and the control logic 166. However, the control logic 166 is generally implemented as software (or firmware) that resides on the controller 160. When the block 166 senses the timestamp TS2 is drifting with respect to the timestamp TS1, the block 166 generally calculates the amount of the frequency adjustment to remove the drift. The block 166 presents the control signals CTR to increase or decrease the frequency of the signal CLK.

The comparison of the timestamp TS1 and the timestamp TS2 and adjustment calculation is generally performed within the software block 166. The calculation does not consume very much computing power (e.g., a low MIPs). The software block 166 does not generally slow down the normal operation of the controller 160. In general, no additional cost is added to the set top box.

The multiplexer 180 may be digitally controlled. The signals ADJ1-ADJn may each have different effective capacitances. The multiplexer 180 generally enables one of the signals ADJ1-ADJn to be selected to change the frequency of the signal CLK. The particular signal ADJ1-ADJn may be selected in response to the signal CTR. The signal CTR may be a software generated control signal. The embedded controller 160 may be implemented as a microprocessor or microsequencer.

Figure 3:
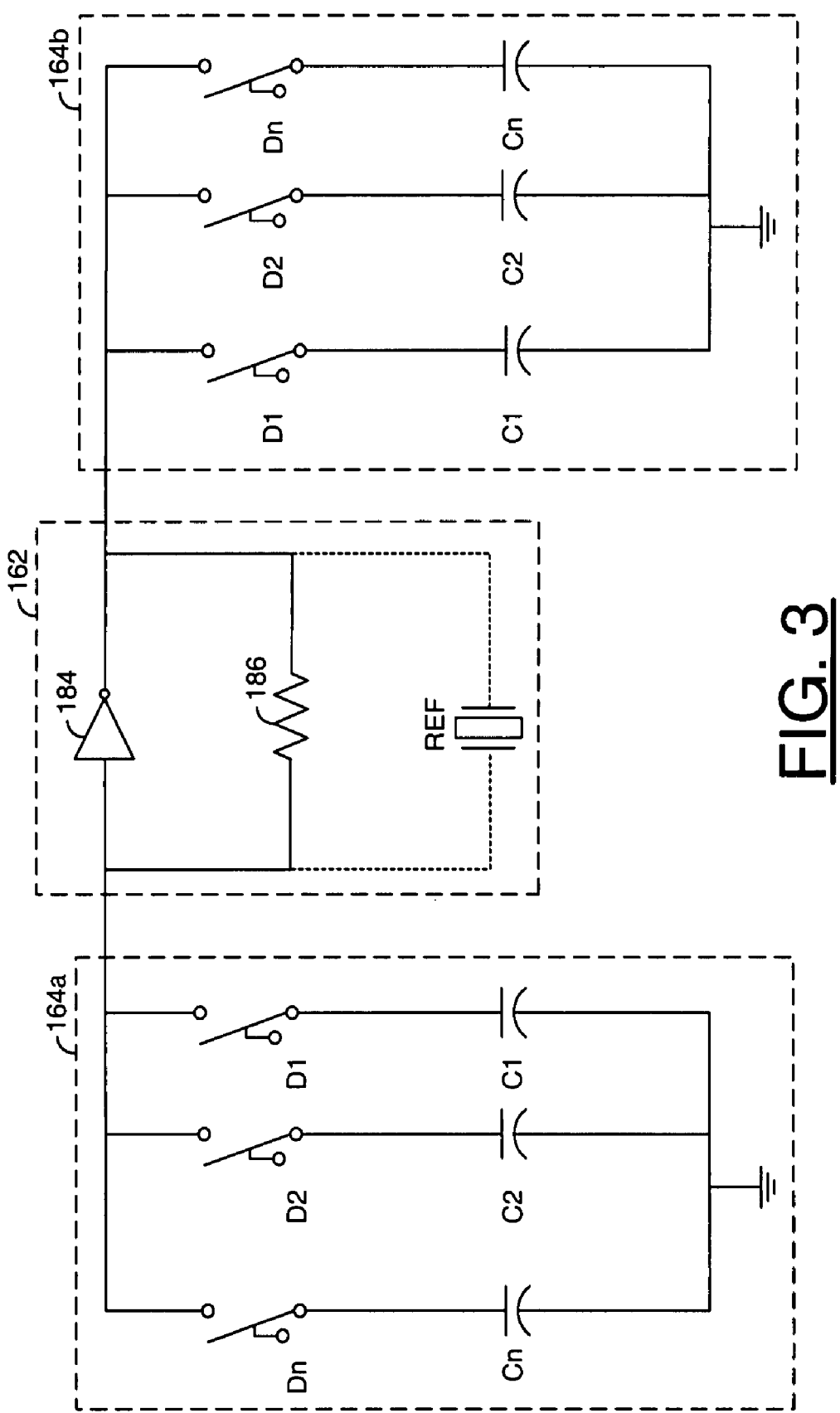
FIG. 3 is a more detailed block diagram of the oscillator and tuning section of FIG. 2.

Referring to FIG. 3, a more detailed diagram of the oscillator 162 and the tuning circuit 164 is shown. The tuning circuit 164 is shown as a first portion 164a and a second portion 164b. The oscillator 162 may be implemented as a DCXO (Digitally Controlled Crystal (Xtal) Oscillator). The oscillator 162 may pull up or down a main reference signal (e.g., REF). In one example, the main reference signal REF may be implemented as a 13.5 MHz signal. However, other frequencies may be implemented to meet the design criteria of a particular implementation. The 13.5 MHz reference signal REF may be used for the all of the Phase Locked Loops (PLLs) in a particular system. The tuning circuit 164a-164b may be used to adjust the signal REF. In one example, the tuning circuit 164a-164b may make adjustments of +150 ppm and −150 ppm. However, other adjustments may be used to meet the design criteria of a particular implementation.

The oscillator 162 is similar to a one inverter Pierce oscillator configuration. A gain stage generally acts as an active component to sustain the oscillations. For clarity, an inverter symbol 184 is used in FIG. 3. A feedback resistor 186, a number of capacitors C1-Cn and the crystal REF generally create a positive feedback, which starts the oscillation. The capacitors C1-Cn are placed symmetrically around the oscillator 162. The capacitor banks C1-Cn are generally controlled digitally through a number of switches (e.g., D1-Dn). Depending on the code in the software 166, any of the switches D1-Dn may be turned on or off. Once a switch D1-Dn is turned on, the associated capacitor pair is connected to the both sides of the crystal REF. The oscillation frequency is inversely proportional to the capacitive load seen by the crystal REF. If the frequency of oscillation needs to be increased, one or more of the digital switches D1-Dn are turned off, until the desired frequency range is achieved. To decrease the frequency of oscillation, one or more of the switches D1-Dn have to be turned on. Since the switches D1-Dn can be controlled easily from the software 166 through the controller 160 the turning off and on process may be software controllable.

Figure 4:
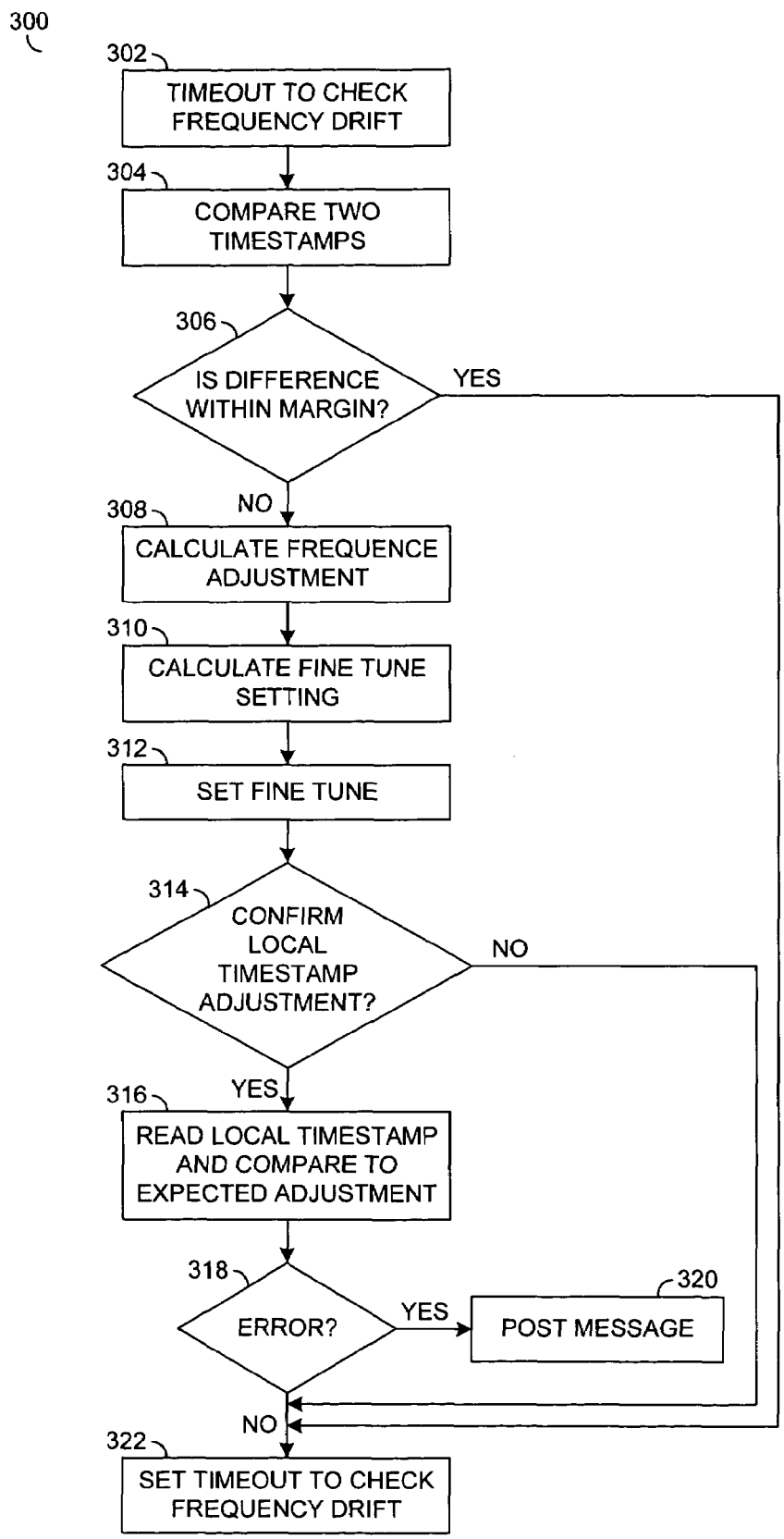
FIG. 4 is a flow diagram illustrating software in accordance with the present invention.

Referring to FIG. 4, a flow diagram of a method (or process) 300 is shown in accordance with a preferred embodiment of the present invention. The process generally comprises a state 302, a state 304, a decision state 306, a state 308, a state 310, a state 312, a decision state 314, a state 316, a decision state 318, a state 320 and a state 322.

The state 302 may provide a timeout period to check for a frequency drift. The state 304 generally checks for drifting between the timestamp TS2 and the timestamp TS1. If the difference between the timestamp TS1 and the timestamp TS2 is within a predefined margin, the method 300 moves to the state 322. If the difference between the timestamp TS1 and TS2 is not within the predefined margin, the method moves to state 308. The predefined margin may be target specification for the system 100. For example, a particular system may use a ±10 ppm (part per million) margin. However, other margins may be implemented to meet the design criteria of a particular implementation. The state 308 generally calculates a frequency adjustment needed to be within the predefined margin. The state 310 generally calculates a fine tune setting. The fine tune setting may be a value of the control signal CTR that reduces the difference (or drift) between the timestamp TS1 and the timestamp TS2. The state 312 generally sets the fine tuning of the circuit 164. The decision state 314 generally confirms the local timestamp adjustment. If a confirmation is not needed, the method 300 moves to the state 322. If a confirmation is needed, the method 300 moves to the state 316. The state 316 reads and compares to local timestamp TS2 to an expected adjustment. The state 318 checks if there is an error. If there is an error, the state 320 generally posts a message. If there is not an error, the method 300 moves to the state 322. The state 322 generally sets a timeout to check frequency drift.

The function performed by the flow diagram of FIG. 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art (s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for controlling the frequency of oscillation of a local clock signal comprising the steps of:
 (A) generating said local clock signal in response to a first control signal;
 (B) generating said first control signal in response to one of a plurality of adjustment signals selected in response to a second control signal; and
 (C) generating said second control signal in response to a comparison between a local timestamp and an external timestamp, wherein (i) said second control signal selects said one of a plurality of adjustment signals when a difference between said local time stamp and said external timestamp is outside a predefined margin, (ii) no adjustment signals are selected when said difference is within said predefined margin, and (iii) said predetermined margin is configurable.

2. The method according to claim 1, wherein said second control signal is generated in further response to said local clock signal.

3. The method according to claim 1, wherein said external timestamp comprises an extracted headend timestamp.

4. The method according to claim 3, wherein said extracted headend timestamp is embedded in a bitstream received from a satellite.

5. The method according to claim 4, wherein said bitstream comprises a digital bitstream.

6. The method according to claim 1, wherein said local timestamp comprises timing information in a satellite set-top box.

7. A computer readable medium configured to store instructions for executing the steps of claim 1.

8. The computer readable medium of claim 7, wherein said instructions are further configured to execute steps for controlling a satellite set top box.

9. An apparatus comprising:
 means for generating a clock signal in response to a first control signal;
 means for generating said first control signal in response to one of a plurality of adjustment signals selected in response to a second control signal; and
 means for generating said second control signal in response to a comparison between a local timestamp and an external timestamp, wherein (i) second control signal selects said one of a plurality of adjustment signals when a difference between said local time stamp and said external timestamp is outside a predefined margin, (ii) no adjustment signals are selected when said difference is within said predefined margin and (iii) said predetermined margin is configurable.

10. An apparatus comprising:
 an oscillator configured to generate a clock signal in response to a first control signal;
 an adjustment circuit configured to generate said first control signal in response to one of a plurality of adjustment signals selected in response to a second control signal; and
 a tuning circuit configured to generate said second control signal in response to a comparison between a local timestamp and an external timestamp, wherein (i) second control signal selects said one of a plurality of adjustment signals when a difference between said local time stamp and said external timestamp is outside a predefined margin, (ii) no adjustment signals are selected when said difference is within said predefined margin and (iii) said predetermined margin is configurable.

11. The apparatus according to claim 10, wherein said plurality of adjustment signals comprise multiplexer configuration signals.

12. The apparatus according to claim 11, wherein said adjustment circuit comprises (i) a processor configured to generate said first control signal and (ii) memory configured to store instructions for generating said first control signal.

13. The apparatus according to claim 10, wherein said external timestamp comprises an extracted headend timestamp.

14. The apparatus according to claim 13, wherein said extracted headend timestamp is embedded in a bitstream received from a satellite.

15. The apparatus according to claim 14, wherein said bitstream comprises a digital bitstream.

16. The apparatus according to claim 10, wherein said local timestamp comprises timing information in a satellite set-top box.

17. The method according to claim 1, wherein said predetermined margin is configurable in response to a control signal received from a computer readable medium configured to execute steps for controlling a satellite set-top box.

18. The method according to claim 1, wherein said method generates an error message if said local time stamp and said external time stamp are not within said predetermined margin.

* * * * *